Figure 1:
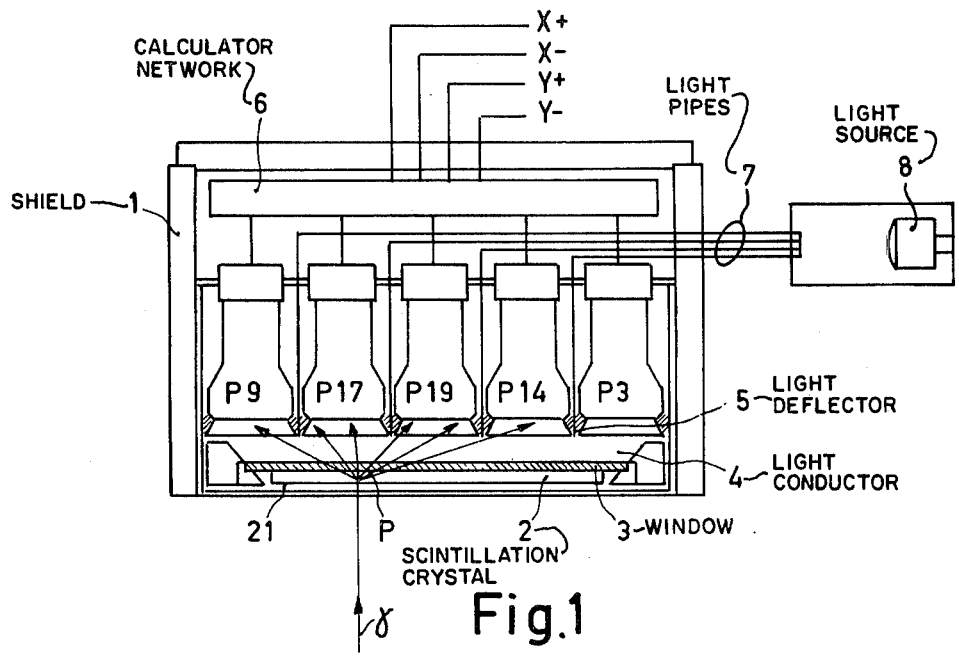

United States Patent [19]

Auphan

[11] 4,047,034

[45] Sept. 6, 1977

[54] AUTOMATIC SYSTEM FOR CONTINUOUSLY CALIBRATING A GAMMA CAMERA

[75] Inventor: Michel Joseph Auphan, Paris, France

[73] Assignee: U.S. Philips Corporation, New York, N.Y.

[21] Appl. No.: 613,622

[22] Filed: Sept. 15, 1975

[30] Foreign Application Priority Data

Sept. 27, 1974 France .................... 74.32687

[51] Int. Cl.² .............................. G01J 1/42
[52] U.S. Cl. .................. 250/354; 250/252; 250/363 R
[58] Field of Search .............. 250/354, 363 S, 252, 250/363

[56] References Cited

U.S. PATENT DOCUMENTS

| 3,428,804 | 2/1969 | Comunnetti | 250/252 |
| 3,560,744 | 2/1971 | Jordan | 250/252 |
| 3,714,441 | 1/1973 | Kreda | 250/207 |
| 3,732,420 | 5/1973 | Brunnett | 250/363 S |
| 3,922,541 | 11/1975 | Seeman | 250/252 |

OTHER PUBLICATIONS

"An Electronically Gated Gamma & X-Ray Calibration Scheme" by Forrest et al., Nuclear Inst. vol. 101, No. 3, 1972 pp. 567–572.

Primary Examiner—Harold A. Dixon
Attorney, Agent, or Firm—Frank R. Trifari; Henry I. Steckler

[57] ABSTRACT

A circuit for continuously recalibrating a gamma camera having a plurality of photomultipliers and signal channels which are weighted to control X and Y deflection on the display. Variation in signal channel gain is controlled and cancelled.

11 Claims, 4 Drawing Figures

AUTOMATIC SYSTEM FOR CONTINUOUSLY CALIBRATING A GAMMA CAMERA

The invention relates to an automatic system for continuously calibrating a gamma camera including photomultipliers.

A gamma camera (scintillation camera) is used as a radiation detector and converts an image formed by gamma radiation into a visible image. A gamma camera incorporating photomultipliers possibly also includes a collimator, a scintillation crystal, a configuration of photomultipliers and a cathode ray tube or monitor for displaying the images. Upon interception of gamma radiation quanta light pulses occur in the material of the scintillation crystal. These light pulses are converted, by means of the said configuration of photomultipliers, into electrical pulses having a comparatively high amplitude. Using a capacitive network, the configuration of photomultipliers is coupled to the cathode ray tube whereto the said capacitive network applies location coordinates of the incident gamma quanta by amplitude selection of the signals supplied by the photomultipliers and by determining the bary centre from these signals. "Bary center" is the geometrical center of the incident gamma radiation.

One of the problems encountered in the use of such a camera is due to the instability of the gain factors of the photomultipliers; for amplitude selection (i.e. the selection of the energy of the incident particule) as well as for the search for the bary centre, it is necessary to determine the relative contribution or the weight of each of the photomultipliers in an accurate manner, any change of the gain factors of the photomultipliers then giving rise to errors in the display of the location of the points of incidence of the gamma particles. Therefore, the invention has for its object to provide an automatic system of continuously recalibrating the gain of each of the intensifiers associated with the photomultipliers, so as to compensate for any deviations of the gain factors of the photomultipliers.

In accordance with the invention, the automatic system for continuously recalibrating a gamma camera is characterized in that the camera comprises the following components:

a device for forming a reference light signal for the assembly of paths to be followed during the photomultiplication, the said device being integrated with the said paths and cooperating with a generator for controlling the periodic calibration operation, cooperating circuits which operate in dependence of the said generator and which are suitable to stabilize the gain factor in each of the said paths at a value between a lower limit and an upper limit of a range about an initial gain factor which is determined by the path under consideration by estimation of the instantaneous gain factor measured by the response of the said paths to a reference light signal, and by successive changes, effected during each calibration period, in the ratio between the resistances of resistors in a resistance bridge connected to the output of each of the said paths, facilities being provided for adapting any change of the said ratio, i.e. the change of the gain factor in each path, to the taking into account of only the light reference signal in the assembly formed by the paths, the said light signal preferably belonging to the spectral range wherein the scintillation light formed in the scintillation crystal is also situated.

The invention will be described in detail hereinafter with reference to the drawing.

Figure 2:
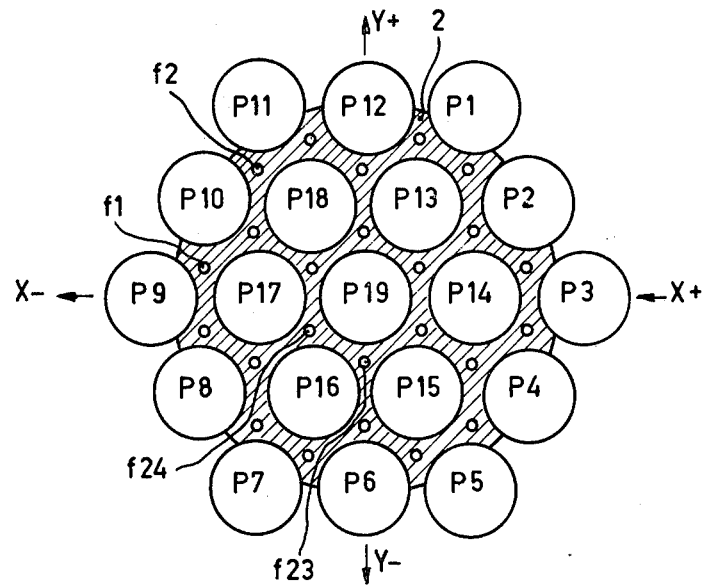
Figure 3:
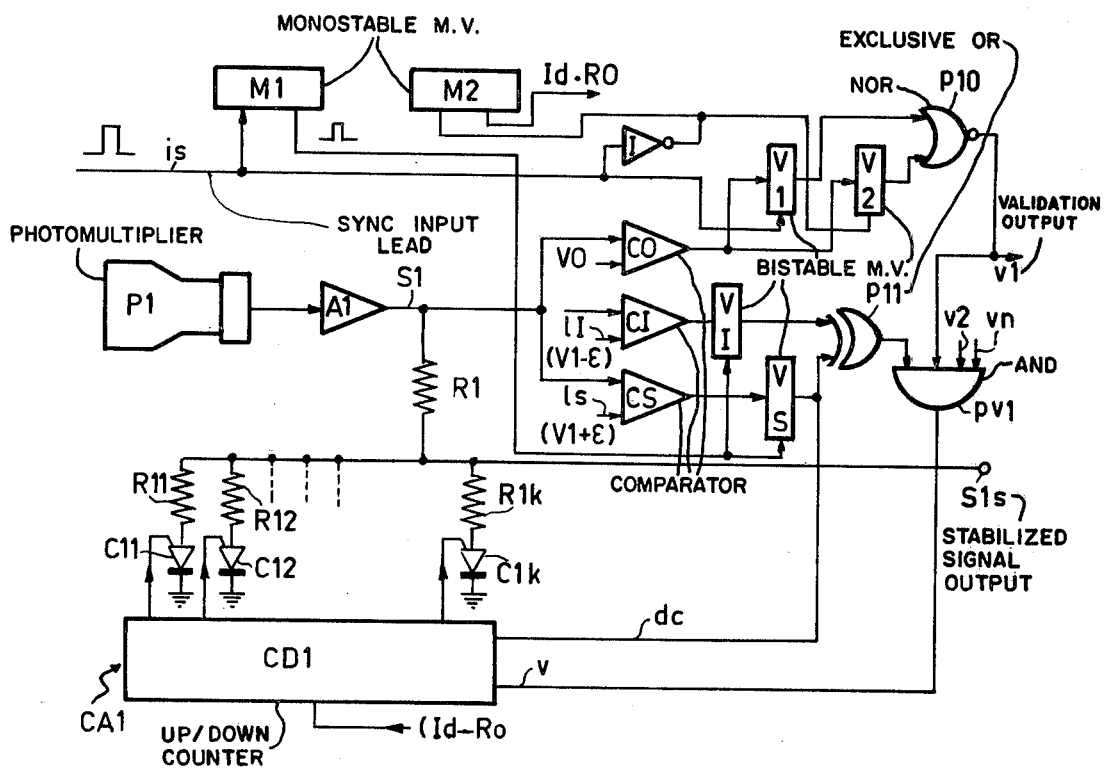
Figure 4:
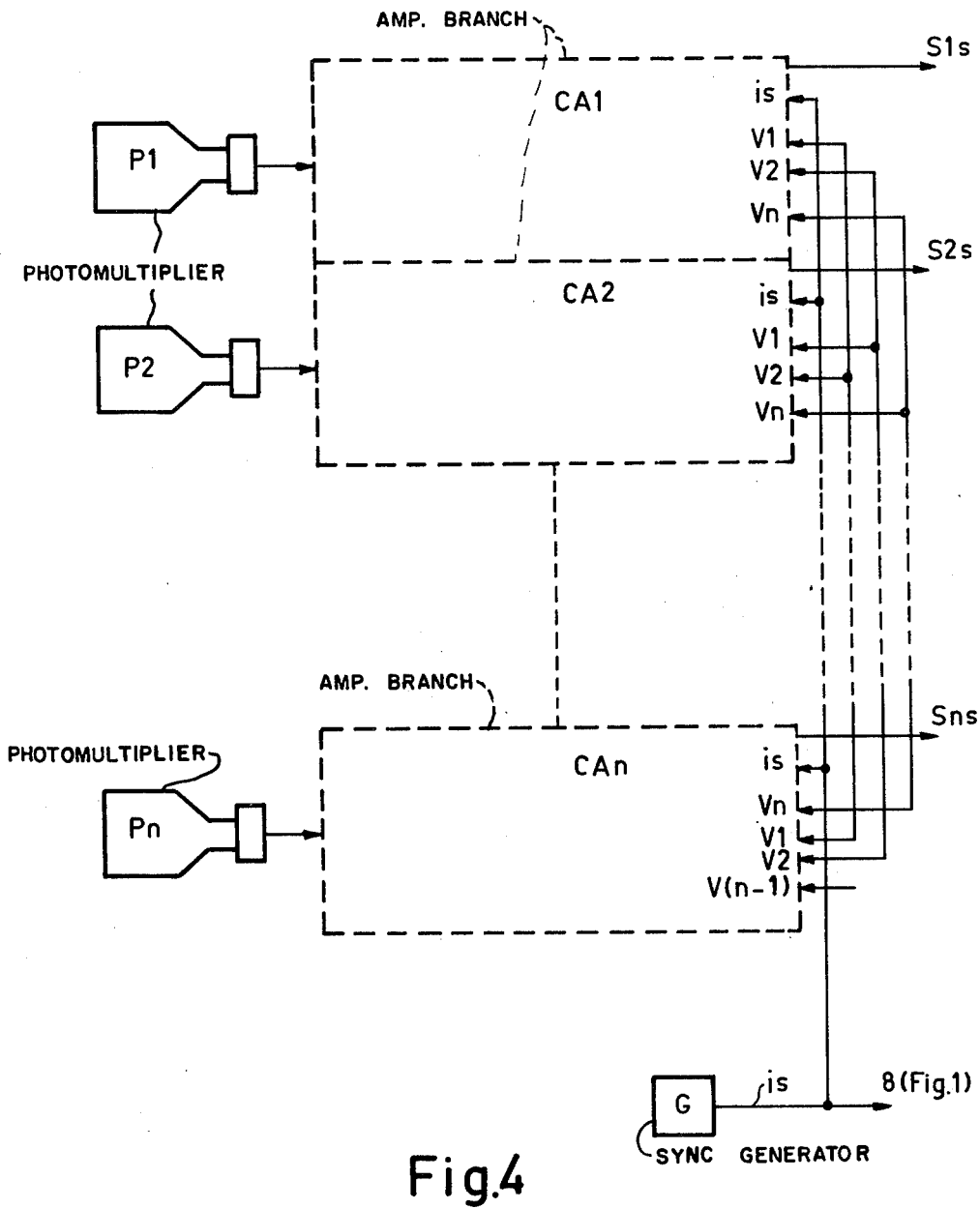

FIG. 1 is a diagrammatic side elevation and sectional view of a gamma camera utilizing the system according to the invention, FIG. 2 is a sectional view taken in the plane of the detectors of the gamma camera, FIGS. 3 and 4 are diagrams of the cooperating circuits.

The camera shown in the FIGS. 1 and 2 is of the Anger type wherein 19 photomultiplier paths are used in this case. The 19 photomultipliers P1 to P19 constitute an hexagonal configuration in a lead shield 1 which is situated opposite a scintillation crystal 2; the incidence of a gamma particle on the material of the scintillation crystal 2 produces visible photons $p$ which move through a window 3 of the crystal housing and which arrive, via a light conductor 4, at the input of the photomultipliers which are provided with a light deflector 5. The electronic calculation network denoted by the reference 6 applies the deflection signals $X +$, $X -$, $Y +$, $Y -$ to the cathode ray tube (not shown).

The amplitude of the signal derived from the output of a photomultiplier for forming the deflection signals is dependent of the position occupied by the said photomultiplier in the configuration. Even though it is of no essential importance for the invention, it is assumed, for example, as regards the signal $X +$, that this signal can be theoretically formed as follows:

$$X + = 0.03\ P1 + 0.035\ P2 + 0.04\ P3 + 0.35\ P4 + 0.03\ P5 + 0.02\ P6 + 0.01\ P7 + 0.005\ P8 + 0.005\ P10 + 0.01\ P11 + 0.02\ P12 + 0.025\ P13 + 0.03\ P14 + 0.025\ P15 + 0.015\ P16 + 0.01\ P17 + 0.015\ P18 + 0.02\ P19.$$

In accordance with the invention, the said camera comprises an automatic system for the continuous recalibration of the camera, the said system utilizing an integrated device for forming one and the same light reference signal for the assembly of photomultiplier paths.

The said integrated device mainly comprises an assembly 7 of 24 identical optical fibres $f1, f2, \ldots f23, f24$ (originating from a single main fibre) which are arranged, as is shown in FIG. 2, in the 24 spaces formed between each time three photomultipliers of the configuration. The end of the said fibres abuts against the light conductor 4. The 24 fibres are illuminated by an electroluminescent diode 8, it being ensured that each of the said fibres receives the same quantity of light. The light departing from the fibres passes the light conductor 4 and is reflected onto the reflector 21 arranged against the scintillation crystal so as to similate the uniform illumination of the assembly formed by the photomultipliers. The reference light signal thus formed is each time treated again so as to compensate for the variations of the gain factors of the photomultipliers. It is to be noted that, if the scintillator is formed by an NaI crystal, wherein the scintillation light is situated in the purple part of the spectrum, the auxiliary light should preferably be chosen in this part of the spectrum also. To this end, the diode can possibly be provided with a filter.

FIG. 3 shows the circuits of an amplification branch CA1 which, in accordance with the invention, cooperates with the photomultiplier P1. FIG. 4 shows the $n$ amplification branches CA1 to CAn, the $n$ amplification branches cooperating with $n$ photomultipliers (because the number of photomultipliers need not necessarily be 19).

An amplifier A1 supplies the amplified signal S1 on the output of the photomulpilier P1; this signal is normally used by the said calculation network so as to form, using the corresponding signals S2, . . . Sn, the deflection signals X+, X−, Y+, Y−.

In accordance with the invention, the signal is stabilized as regards amplification and is converted into a signal S1s before it is applied to the calculation network: the amplification path includes a digital potentiometer which is formed by a series resistor R1 and $k$ parallel connected resistors R11 to R1$k$. The said potentiometer serves for the adjustment of the gain of the branch on the basis of an electrical signal in the form of a binary combination of $k$ bits which is supplied by a circuit CD1. Depending on the binary value ("1" or "0") of the signals appearing on the $k$ outputs of the circuit CD1, the resistors R11 to R1$k$ are connected to earth or not via the switches C11 to C1$k$.

The circuit CD1 is actually a bi-directional counter which each time counts up or down by one unit, depending on the polarity of the signal received which is determined by the validation condition $v$ and by the value of the switch-off pulse (Id-RO). The formation of the said conditions and the pulse will be explained hereinafter.

The initial gain as regards a path under consideration is determined by the state of the counter circuit CD1. The system according to the invention enables the instantaneous gain factor to be reduced and/or maintained at a value between a lower limit $1I(V_1 - \epsilon)$ and an upper limit $1S(V_1 + \epsilon)$ of a narrow range wherein the initial gain $V_1$ is also situated.

In order for the system to achieve its object, it should be possible, of course, to estimate the instantaneous gain of each photomultiplier path for one and the same light phenomenon; the said estimate is the function of the reference light pulse formed by the actuation of the electroluminescent diode which forms part of the device described with reference to the FIGS. 1 and 2. The generator G shown in FIG. 4 supplies synchronization pulses $is$ for the actuation of the said diode; these pulses are also applied to each amplification traject of the system, i.e. the trajects CA1, CA2, CAn; the calibration is periodically checked, whilst $c$, that is to say the time expiring between two pulses $is$, may be small and have a value in the order of one second during the operation of the camera. Finally, an evaluation of the results must be avoided if a luminescent pulse coincides with a gamma particle, even a diffused gamma particle, because otherwise the calibration will be incorrect.

the circuit CA1 shown in FIG. 3 comprises, besides the said counter circuit CD1 and the said digital potentiometer, three comparators CO, CI and CS which receive the signal S1; the second inputs of these comparators receive the signals VO = 0, $1I = (V_1 - \epsilon)$ and $1S = (V_1 + \epsilon)$, respectively, $V_1$ being the initial gain.

The comparator CO cooperates with two bistable elements V1 and V2 of the "latch" type which memorize the state of the path under consideration at the beginning and at the end of the synchronization pulse: the bistable element V1 is unlatched in reaction to the positive-going edge of the pulse, whilst the bistable element V2 is unlatched in reaction to the negative-going edge (reversing switch I). The duration $d$ of the pulse $is$ is chosen to be shorter than the scintillation time constant of the scintillation crystal (the said duration amounts to, for example, approximately 250 μs). If the instantaneous state of the bistable elements V1 and V2 implies that the signal S1 was equal to zero at the instant at which the said elements were unlatched, the NOR-gate p10 supplies one of the transfer conditions $v1$ of the validation AND-gate $pv1$. Among the other transfer conditions of the said gate, the conditions $v2$ to $vn$ are taken into account. As is shown in FIG. 4, the said conditions are supplied by the circuits CA2 to CAn (also when $v1$ is transferred to these circuits). It is thus possible to establish whether the $n$ transfer trajects are in the zero state and receive this value at the beginning and the end of the synchronization pulse, which ensures that no gamma particle has switched off the scintillation crystal during the calibration period.

Each comparator CI, CS cooperates with a bistable element VI, VS which is also of the latch type; these two elements are unlatched under the control of a monostable element M1 which assumes a high level in reaction to the positive-going edge of the synchronization pulse $is$. If the instantaneous gain is smaller than $1I(V_1 - \epsilon)$ or larger than $1S(V_1 + \epsilon)$, either the element VI or the element VS assumes a high level, which allows determination of the direction of the counter circuit CD1, i.e. counting down or counting up (in the case shown, this is effected via the element VS which supplies the condition dc). The exclusive-OR gate $p11$, connected to the output of the bistable elements VI and VS, supplies the last validation condition of the gate $pV1$; this circuit thus prevents any validation of the counter circuit CD1 if none of the bistable elements VI and VS has assumed a high level, that is to say when the gain is correct.

The control of the counting up or down of the counter circuit CD1 when one of the two stable elements has assumed a high level is thus effected as a function of the conditions $v$ and $dc$; the pulse (Id-RO) constitutes the switch-off pulse for the clock of the counter circuit CD1; the said pulse if formed by the monostable element M2 which assumes a high level in reaction to the negative-going edge of the pulse $is$. The said pulse (Id-RO) is used for resetting the four stable elements V1, V2, VI and VS to zero.

The foregoing description was given merely by way of example for realizing an automatic system according to the invention. Many alternatives will be obvious to those skilled in the art without departing from the scope of the invention.

What is claimed is:

1. An automatic system for the continuous re-calibration of a gamma ray camera comprising a scintillation crystal, a light conductor disposed proximate said crystal, a plurality of signal channels each including a photomultiplier disposed proximate said conductor, said automatic system comprising, a device means for forming a reference light signal for the photomultipliers, said device means being disposed among said photomulitipliers, a generator means coupled to said device means for controlling the pulsed periodical calibration operation, a plurality of cooperating circuits means coupled to said generator means for stabilizing the gain factor in each of said channels respectively at a value between a lower limit and an upper limit of a range about an initial gain factor, each of said stabilizing means comprising a resistance bridge including a plurality of resistors coupled to said photomultipliers, and means for changing the ratio of said resistors; and means for determining said initial gain factor with respect to only said reference light signal.

2. An automatic system as claimed in claim 1, wherein the control generator means supplies synchronization pulses having a duration which is shorter than the scintillation constant of the scintillation crystal of the gamma camera.

3. An automatic system as claimed in claim 1, wherein the device means for forming the reference light signal comprises an electro-luminescent diode and an assembly of optical fibres which are in contact with the light conductor, said fibres being arranged between the photomultipliers and being illuminated by the said diode which is electrically coupled to the control generator means.

4. An automatic system as claimed in 3, wherein said photomultipliers are in a hexagonal configuration, and said optical fibres are arranged in the centre of each of the free spaces between each of groups of three adjoining photomultipliers.

5. A system as claimed in claim 1 wherein said light signal is in the spectral range of the scintillation light from the crystal.

6. An automatic system as claimed in claim 1, wherein the signal channels comprises a plurality of amplifiers respectively wherein the gain is stabilized and which are coupled to the plurality of photomultipliers respectively, each of said resistance bridges comprising a digital potentiometer, the stabilized output signal being taken from an intermediate output thereof, each of said cooperating circuits including a binary register comprising a plurality of positions coupled to said potentiometer, the preset state of said register determining the gain at the initial value V determined for the respective channel, and two gain comparators having first inputs which receive the amplified reference light signal supplied by the photomultiplier, the second inputs thereof being set to signal values which equal $(V-\epsilon)$ and $(V+\epsilon)$, respectively, said binary register being a bi-directional counter which counts up and down by each time one unit under the control of the comparators determining that the gain is smaller than $(V-\epsilon)$ or larger than $(V+\epsilon)$.

7. An automatic system as claimed in claim 6, wherein the digital potentiometer in each channel whose gain is stabilized includes a fixed series resistor which is coupled on the one side to the output of the corresponding amplifier, and one the other side to an output which is stabilized in relation to the gain, a network of fixed parallel resistors which are coupled on the one side to said stabilized output, and a plurality of switching means coupled between the remaining side of said parallel resistors and ground, and having control electrodes coupled to the counter outputs.

8. An automatic system as claimed in claim 6, wherein each cooperating circuit comprises a validation circuit of the register, said validation circuit including a comparator having a first input which is coupled to said amplifier, and a second input which is set to a signal value of zero, two bistable latching elements which are coupled to the output of the comparator and which respectively operate as a function of the positive-going and negative-going edges of each synchronization pulse from said generator means which causes the formation of the light reference signal, an inverting NOR-gate having two inputs which are coupled to the respective outputs of the two bistable elements, and a validation AND-gate which is coupled to the register and has an input coupled to said NOR-gate.

9. An automatic system as claimed in claim 8, wherein the validation AND-gate of the validation circuit comprises a plurality of inputs, the first input being coupled to the output of the the inverting NOR-gate of the validation circuit of the branch under consideration, all but one of the other inputs being coupled to the outputs of the inverting NOR-gates of the validation circuits of the other branches of the system.

10. An automatic system as claimed in claim 8, wherein the validation circuit also comprises an exclusive OR-gate having an output coupled to the validation AND-gate, two bistable latching elements coupled to said gain comparators respectively, a monostable unlatching element which is controlled by the positive-going edge of each synchronization pulse and having an output coupled to said bistable elements, the outputs of said two bistable elements being coupled to the inputs of the exclusive OR-gate.

11. An automatic system as claimed in claim 10, wherein each signal channel whose gain is stabilized also comprises a monostable control circuit means which is controlled by the negative-going edge of each synchronization pulse for resetting to zero the four latch-type bistable elements and for switching off a clock of the register, the counting sense of said counter being determined by the state of the said bistable elements coupled to the gain comparators.

* * * * *